US012007248B2

(12) United States Patent
Dutta et al.

(10) Patent No.: US 12,007,248 B2
(45) Date of Patent: Jun. 11, 2024

(54) ICE THICKNESS ESTIMATION FOR MOBILE OBJECT OPERATION

(71) Applicant: Ford Global Technologies, LLC, Dearborn, MI (US)

(72) Inventors: Arun Dutta, Ann Arbor, MI (US); Nithya Somanath, Farmington Hills, MI (US); Colleen Cauvet, Canton, MI (US); Collin Hurley, Canton, MI (US); David Hamilton, Troy, MI (US); Donald Paul Bilger, Livonia, MI (US); Javier Onate, Muncie, DE (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 17/685,443

(22) Filed: Mar. 3, 2022

(65) Prior Publication Data

US 2023/0280181 A1  Sep. 7, 2023

(51) Int. Cl.
| | |
|---|---|
| *G06F 17/00* | (2019.01) |
| *B60W 40/06* | (2012.01) |
| *B63B 49/00* | (2006.01) |
| *B63B 79/15* | (2020.01) |
| *G01C 21/00* | (2006.01) |

(Continued)

(52) U.S. Cl.
CPC ......... *G01C 21/3841* (2020.08); *B60W 40/06* (2013.01); *B63B 49/00* (2013.01); *B63B 79/15* (2020.01); *G01C 21/3461* (2013.01); *G01C 21/3626* (2013.01); *G01C 21/3815* (2020.08); *G06N 3/08* (2013.01); *B60W 2555/20* (2020.02); *B60W 2556/50* (2020.02); *G01B 15/02* (2013.01); *G01J 2005/0077* (2013.01)

(58) Field of Classification Search
CPC ............ G01C 21/3841; G01C 21/3461; G01C 21/3626; G01C 21/3815; B60W 40/06; B60W 2555/20; B60W 2556/50; G06N 3/08; G01B 15/02; G01J 2005/0077
USPC .......................................................... 701/422
See application file for complete search history.

(56) References Cited

U.S. PATENT DOCUMENTS

| | | | |
|---|---|---|---|
| 3,634,753 A | 1/1972 | Unterberger | |
| 6,650,252 B2 * | 11/2003 | Miller, Jr. .............. | G07C 5/008 340/988 |

(Continued)

FOREIGN PATENT DOCUMENTS

WO  2020109406 A1  6/2020

OTHER PUBLICATIONS

Light, Monitoring winter ice conditions using thermal imaging cameras equipped with infrared microbolometer sensors, Elsevier Ltd (Year: 2012).*

*Primary Examiner* — Matthew Ell
*Assistant Examiner* — Matthew J Ludwig
(74) *Attorney, Agent, or Firm* — Frank Lollo; Bejin Bieneman PLC

(57) ABSTRACT

Upon determining a mobile object is approaching an ice layer above a body of water, a thermal image of the ice layer is obtained. The thermal image and ambient temperature data are input to a neural network that outputs a plurality of regions of the ice layer and respective estimated thicknesses for the regions. A classification for each region is determined based on its estimated thickness and the mobile object. The classification is one of preferred or nonpreferred. The classifications for the regions are output.

20 Claims, 10 Drawing Sheets

(51) Int. Cl.
  *G01C 21/34* (2006.01)
  *G01C 21/36* (2006.01)
  *G06N 3/08* (2023.01)
  *G01B 15/02* (2006.01)
  *G01J 5/00* (2022.01)

(56) References Cited

U.S. PATENT DOCUMENTS

| | | |
|---|---|---|
| 10,921,810 B2 | 2/2021 | Kutila et al. |
| 11,131,789 B2 | 9/2021 | Arandia et al. |
| 11,775,870 B2 * | 10/2023 | Zhou .................... G05D 1/0255 706/12 |
| 2010/0141765 A1 * | 6/2010 | Capello ............... B60W 40/068 348/149 |
| 2014/0267628 A1 * | 9/2014 | Randler ................. H04N 7/181 348/47 |
| 2018/0060674 A1 * | 3/2018 | Zhao .................... G06V 10/811 |
| 2020/0340914 A1 | 10/2020 | Kanda et al. |
| 2021/0065565 A1 * | 3/2021 | Dow .................... G08G 5/0013 |
| 2021/0383269 A1 * | 12/2021 | Zhou .................... G05D 1/0231 |
| 2022/0107266 A1 * | 4/2022 | Baumgartner ..... G01N 21/3554 |
| 2022/0161802 A1 * | 5/2022 | Jiang .................... B60W 40/06 |
| 2022/0281456 A1 * | 9/2022 | Giovanardi ........... G01S 7/4021 |

\* cited by examiner

ICE THICKNESS ESTIMATION FOR MOBILE OBJECT OPERATION

BACKGROUND

A vehicle can be equipped with electronic and electromechanical components, e.g., computing devices, networks, sensors, and controllers, etc. A computer can acquire data regarding the vehicle's environment and can operate the vehicle or at least some components thereof based on the acquired data. Vehicle sensors can provide data concerning routes to be traveled and objects in the vehicle's environment. Monitoring of the vehicle can rely upon acquiring accurate and timely data regarding objects in a vehicle's environment while the vehicle is traveling along a route or stopped at a waypoint on the route. Monitoring can be adapted to a travel surface of a vehicle. For example, when a vehicle is traveling over ice, sensors may be configured to monitor the ice.

DETAILED DESCRIPTION

Figure 1:
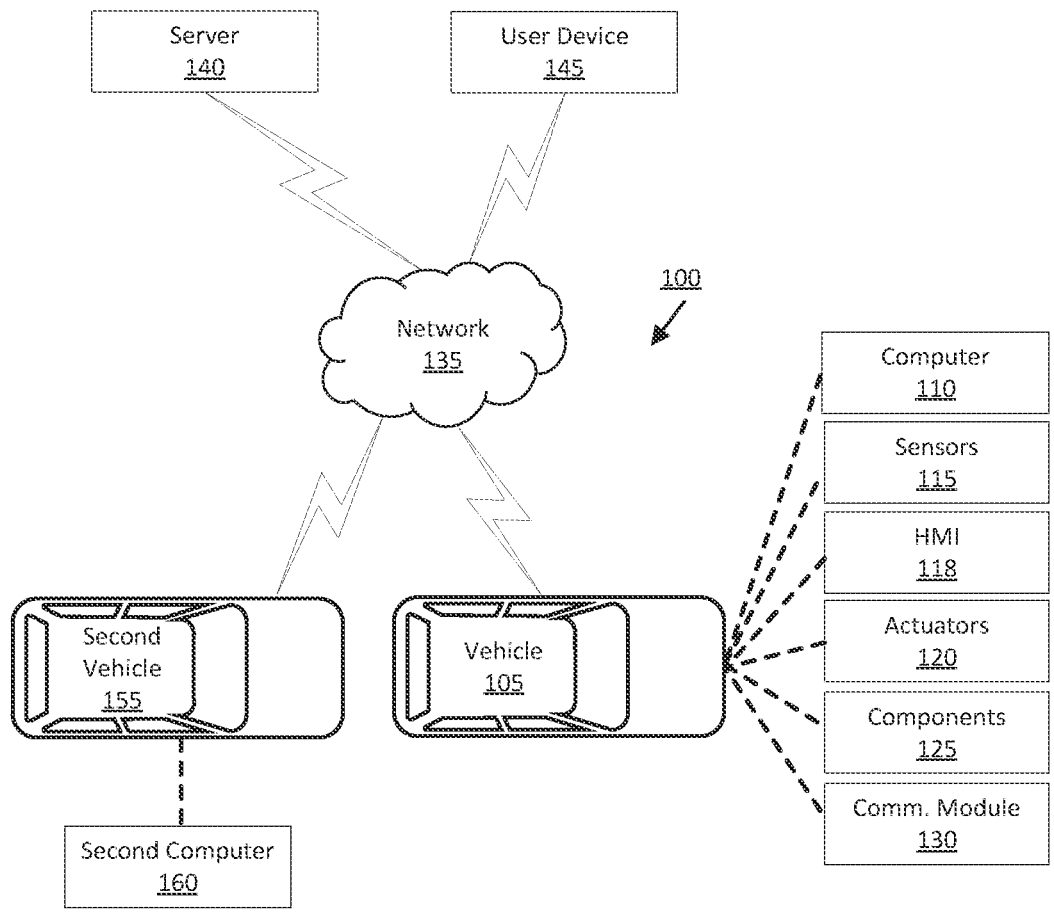
FIG. 1 is a block diagram of an example control system for a vehicle.

A mobile object can traverse, i.e., travel on, an ice layer above a body of water. A minimum thickness of the ice layer, e.g., based on the type of mobile object, is typically desirable to allow the mobile object to traverse the ice layer. Attempting to traverse an ice layer with an undesirable thickness can increase a likelihood of the mobile object being prevented from traversing the ice layer, e.g., by breaking through the ice layer (e.g., when the mobile object is a land vehicle or a pedestrian) or by getting stuck on the ice layer (e.g., when the mobile object is a watercraft). The thickness of the ice layer may be estimated based on environmental models and/or physical measurements. However, since an ice layer may not form uniformly above a body of water, different regions of the ice layer may have different thicknesses. That is, the environmental model or physical measurement may be unable to accurately model ice formation, and varying thicknesses, across the ice layer.

Advantageously, upon detecting a mobile object (e.g., a vehicle) approaching an ice layer, a computer (e.g., a vehicle computer) can obtain a thermal image of the ice layer, providing for determinations concerning the ice layer, and more efficient operation of a mobile object (e.g., vehicle) than using other technologies such as using environmental models or physical measurements. The computer can input the thermal image and ambient temperature data into a neural network that outputs a plurality of regions of the ice layer and estimated thicknesses for the regions. The computer can then classify the regions as preferred or nonpreferred based on the estimated thickness and the mobile object. By using a thermal image to estimate thicknesses of regions of the ice layer, the computer can detect the ice layer in environmental conditions, e.g., fog, rain, snow, etc., that may preclude or impair non-thermal sensors from accurately detecting the ice layer. The computer can thus classify regions of the ice layer regardless of the environmental conditions. Further, classifying the regions based on the estimated thickness and the mobile object allows the computer to determine regions of the ice layer that can allow efficient travel on an ice layer by the mobile object.

A system, comprising a computer including a processor and a memory, the memory storing instructions executable by the processor to, upon determining a mobile object is approaching an ice layer above a body of water, obtain a thermal image of the ice layer. The instructions further include instructions to input the thermal image and ambient temperature data to a neural network that outputs a plurality of regions of the ice layer and respective estimated thicknesses for the regions. The instructions further include instructions to determine a classification for each region based on its estimated thickness and the mobile object. The classification is one of preferred or nonpreferred. The instructions further include instructions to output the classifications for the regions.

The mobile object can be one of a land vehicle or a pedestrian. The instructions can further include instructions to classify one of the regions as preferred based on the estimated thickness of the respective region being greater than a threshold thickness.

The instructions can further include instructions to determine the threshold thickness based on a user input.

The instructions can further include instructions to determine the threshold thickness based on a characteristic of the mobile object.

The instructions can further include instructions to classify the one of the regions as nonpreferred based on the estimated thickness of the respective region being less than or equal to the threshold thickness.

The mobile object can be a watercraft. The instructions can further include instructions to classify one of the regions as preferred based on the estimated thickness of the respective region being less than or equal to a threshold thickness.

The instructions can further include instructions to determine a planned path for the mobile object based on the classifications of the regions.

The instructions can further include instructions to output the planned path for the mobile object.

The instructions can further include instructions to provide the planned path for the mobile object to a remote computer.

The instructions can further include instructions to update map data for the ice layer based on the classifications of the regions.

The instructions can further include instructions to provide the updated map data to a remote computer.

The system includes the remote computer having a second processor and a second memory. The second memory storing instructions executable by the second processor to update a map based on aggregated data including updated map data from a plurality of mobile objects.

The instructions can further include instructions to predict a future time at which the classification for one region will transition between preferred and nonpreferred based on a characteristic of the mobile object and predicted ambient temperature data.

The instructions can further include instructions to, upon determining the mobile object remains stationary for a duration of a timer, determining updated classifications for the region in which the mobile object is located based on an updated ambient temperature and temperature data of the mobile object.

The updated ambient temperature can be obtained upon expiration of the timer.

The instructions can further include instructions to output the updated classification.

The instructions can further include instructions to update map data for the ice layer based on the updated classification.

The ambient temperature data can include current ambient temperature and historical ambient temperature A method includes, upon determining a mobile object is approaching an ice layer above a body of water, obtaining a thermal image of the ice layer. The method further includes inputting the thermal image and ambient temperature data to a neural network that outputs a plurality of regions of the ice layer and respective estimated thicknesses for the regions. The method further includes determining a classification for each region based on its estimated thickness and the mobile object. The classification is one of preferred or nonpreferred. The method further includes outputting the classifications for the regions.

The method can further include determining a planned path for the mobile object based on the classifications of the regions.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-5, an example control system 100 includes a vehicle 105. According to some implementations, the vehicle 105 can be a land vehicle such as a car, truck, etc. According to other implementations, the vehicle 105 can be a watercraft (e.g., a ship). A computer 110 in the vehicle 105 receives data from sensors 115. According to yet other implementations, vehicle 105 can be an aerial vehicle, such as a fixed-wing aircraft (e.g., an airplane), a rotary-wing aircraft (e.g., a helicopter), or a lighter-than-air aircraft (e.g., an airship or a drone). The computer 110 is programmed to, upon determining a mobile object 205 is approaching an ice layer 210 above a body of water 200, obtain a thermal image of the ice layer 210. The computer 110 is further programmed to input the thermal image and ambient temperature data to a neural network 500 that outputs a plurality of regions 215 of the ice layer 210 and respective estimated thicknesses for the regions 215. The computer 110 is further programmed to determine a classification for each region 215 based on its estimated thickness and the mobile object 205. The classification is one of preferred or nonpreferred. The computer 110 is further programmed to output the classifications for the regions 215.

Turning now to FIG. 1, the vehicle 105 includes the computer 110, sensors 115, actuators 120 to actuate various vehicle components 125, and a vehicle communications module 130. The communications module 130 allows the computer 110 to communicate with a remote server computer 140, a user device 145, and/or other vehicles, e.g., via a messaging or broadcast protocol such as Dedicated Short Range Communications (DSRC), cellular, IEEE 802.11, Bluetooth®, Ultra-Wideband (UWB), and/or other protocol that can support vehicle-to-vehicle, vehicle-to infrastructure, vehicle-to-cloud communications, or the like, and/or via a packet network 135.

The computer 110 includes a processor and a memory such as are known. The memory includes one or more forms of computer readable media, and stores instructions executable by the computer 110 for performing various operations, including as disclosed herein. The computer 110 can further include two or more computing devices operating in concert to carry out vehicle 105 operations including as described herein. Further, the computer 110 can be a generic computer with a processor and memory as described above, and/or may include an electronic control unit (ECU) or electronic controller or the like for a specific function or set of functions, and/or may include a dedicated electronic circuit including an ASIC (application specific integrated circuit) that is manufactured for a particular operation, e.g., an ASIC for processing sensor data and/or communicating the sensor data. In another example, the computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 110.

The computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the computer 110, as opposed to a human operator, is to control such operations.

The computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The computer 110 is generally arranged for communications on a vehicle communication network that can include a bus in the vehicle 105 such as a controller area network (CAN) or the like, and/or other wired and/or wireless mechanisms.

Via the vehicle 105 network, the computer 110 may transmit messages to various devices in the vehicle 105 and/or receive messages (e.g., CAN messages) from the various devices, e.g., sensors 115, an actuator 120, ECUs, etc. Alternatively, or additionally, in cases where the computer 110 actually comprises a plurality of devices, the vehicle communication network may be used for communications between devices represented as the computer 110 in this disclosure. Further, as mentioned below, various controllers and/or sensors 115 may provide data to the computer 110 via the vehicle communication network.

Vehicle 105 sensors 115 may include a variety of devices such as are known to provide data to the computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes user input devices such as knobs, buttons, switches, pedals, levers, touchscreens, and/or microphones, etc. The input devices may include sensors 115 to detect user inputs and provide user input data to the computer 110. That is, the computer 110 may be programmed to receive user input from the HMI 118. The user may provide each user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the computer 110 and used to determine the selection of the user input.

The HMI 118 typically further includes output devices such as displays (including touchscreen displays), speakers, and/or lights, etc., that output signals or data to the user. The HMI 118 is coupled to the vehicle communications network and can send and/or receive messages to/from the computer 110 and other vehicle sub-systems.

In addition, the computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, UWB, IEEE 802.11, dedicated short range communications (DSRC), and/or wide area networks (WAN), including the Internet, providing data communication services.

The network 135 represents one or more mechanisms by which a computer 110 may communicate with remote computing devices, e.g., the remote server computer 140, another computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, UWB, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

The mobile object 205 may be any object that moves under power generated by or in the mobile object (e.g., a bicycle is a mobile object but a boulder is not). As one example, the mobile object 205 may be a vehicle (See FIG. 2A). For example, the mobile object 205 may be the vehicle 105. As another example, the mobile object 205 may be a second vehicle 155, e.g., another land vehicle, e.g., a car, a truck, a snowmobile, etc., or a watercraft (See FIG. 2B). In such an example, the second vehicle 155 includes a second computer 160. The second computer 160 includes a second processor and a second memory such as are known. The second memory includes one or more forms of computer readable media, and stores instructions executable by the second computer 160 for performing various operations, including as disclosed herein.

Additionally, the second vehicle 155 may include sensors, actuators to actuate various vehicle components, and a vehicle communications module. The sensors, actuators to actuate various vehicle components, and the vehicle communications module typically have features in common with the sensors 115, actuators 120 to actuate various vehicle components 125, and the vehicle communications module 130, and therefore will not be described further to avoid redundancy.

Figure 2A:
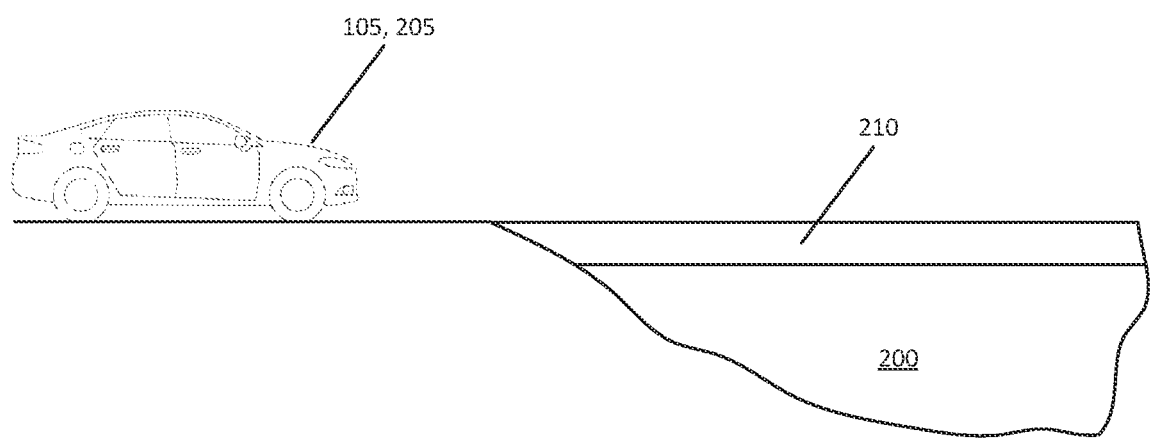
FIGS. 2A-2C are diagrams illustrating example mobile objects approaching an example ice layer.
Figure 2B:
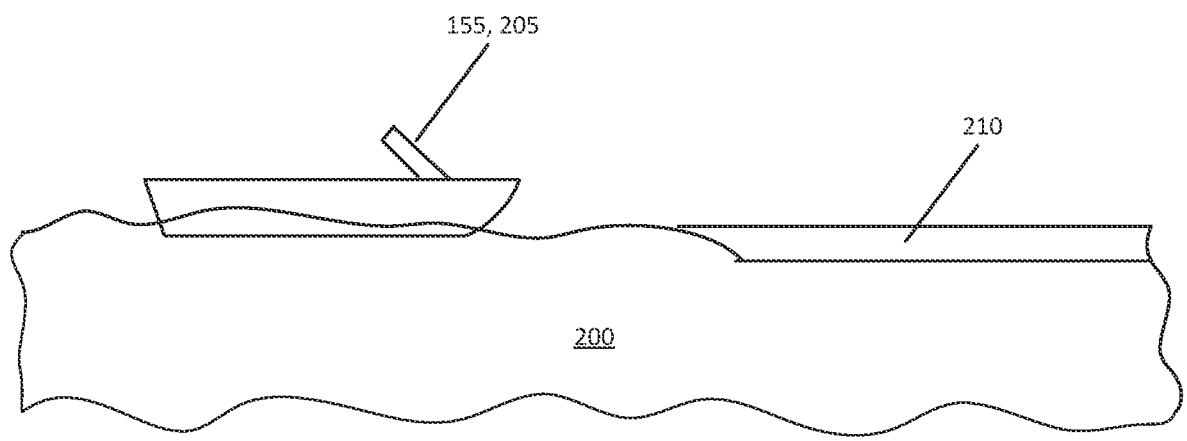
Figure 2C:
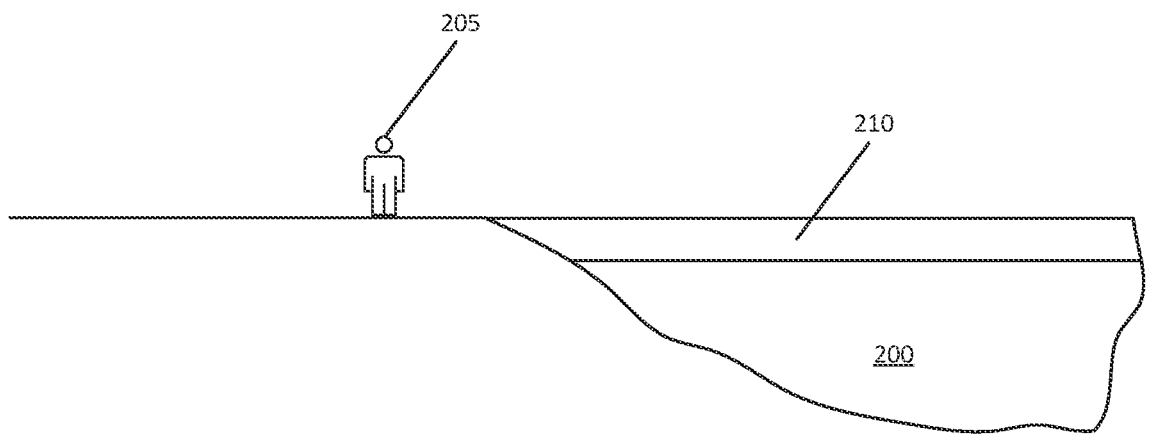
Figure 3:
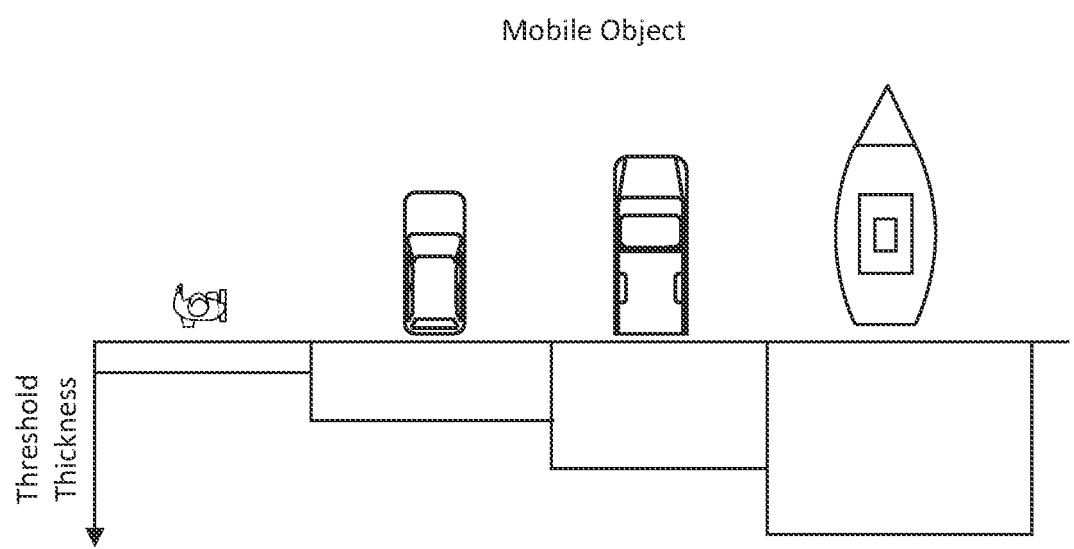
FIG. 3 is an example bar chart of threshold thicknesses for example mobile objects.
Figure 4A:
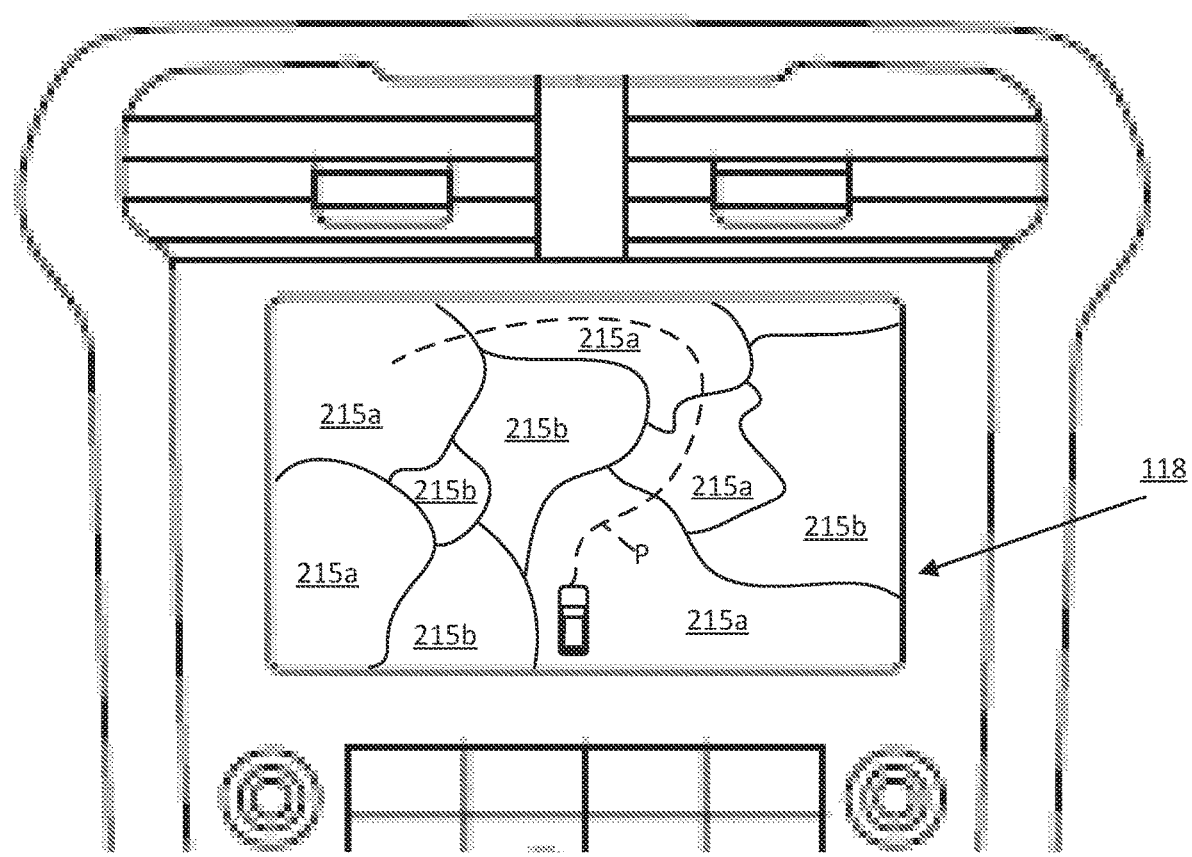
FIGS. 4A-4B are diagrams illustrating outputting example classifications of example regions of the example ice layer.
Figure 4B:
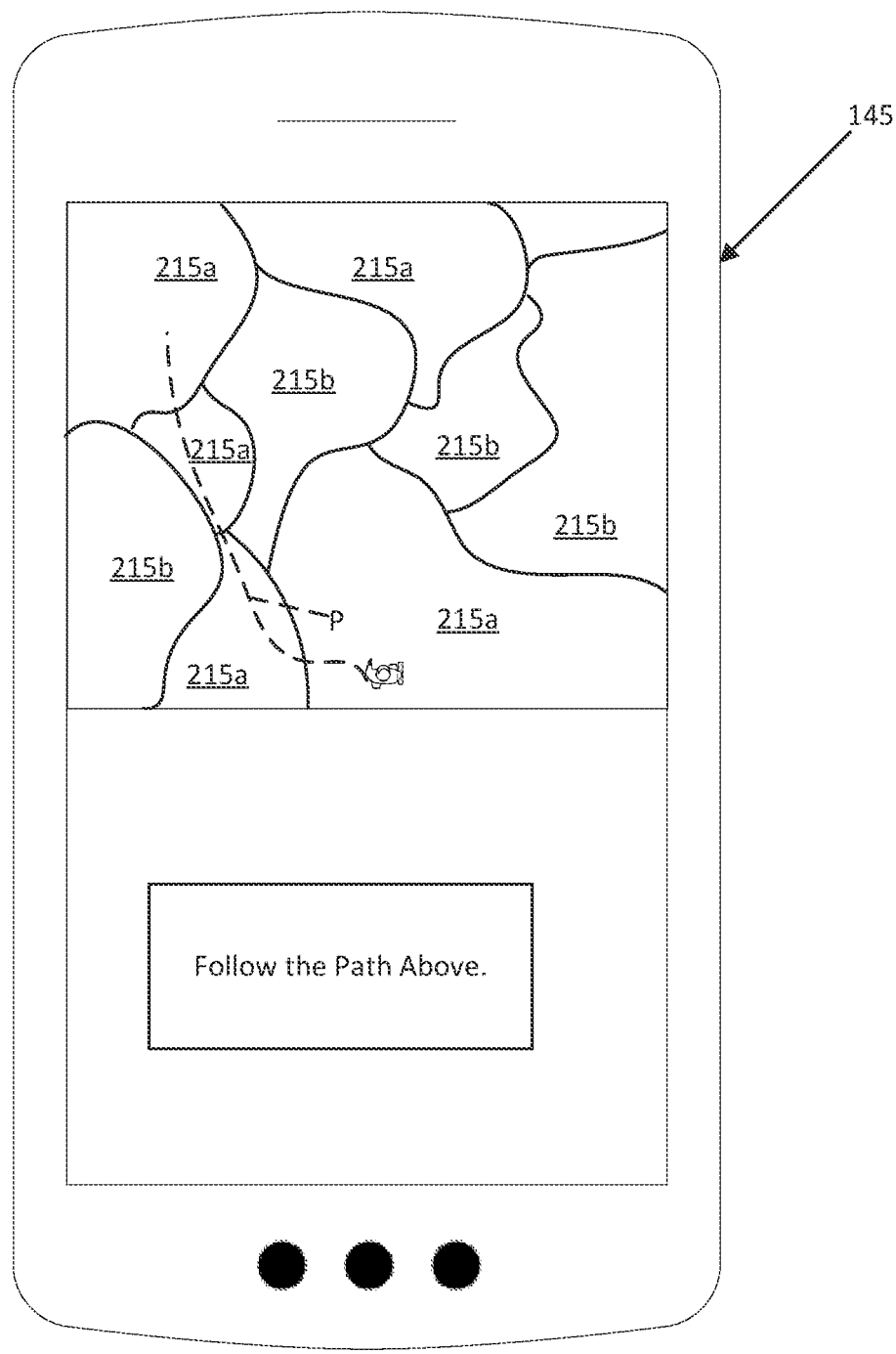

As another example, the mobile object 205 may be a pedestrian (See FIG. 2C). In such an example, a user device 145 may be associated with the pedestrian. The user device 145 can be a conventional computing device, i.e., including one or more processors and one or more memories, programmed to provide operations such as disclosed herein. The user device 145 can be a portable device. A portable device can be any one of a variety of computers that can be used while carried by a person, e.g., a smartphone, a tablet, a personal digital assistant, a smart watch, a drone etc. Further, the user device 145 can be accessed via the network 135, e.g., the Internet, a cellular network, and/or or some other wide area network.

The user device 145 includes one or more output devices such as displays (including touchscreen displays), speakers, and/or lights, etc., that output signals or data to the user. For example, the user device 145 may include an HMI having the output device(s). The HMI of the user device 145 has features in common with the HMI 118 of the computer 110, e.g., input devices and output devices, and therefore will not be described further to avoid redundancy.

The computer 110 is programmed to identify an ice layer 210 above a body of water 200. An ice layer 210 is an area of ice that has formed above a body of water 200. In this context, the body of water 200 has a depth such that a mobile object 205 may be submerged in the body of water 200. Once submerged, the mobile object 205 may be unable to traverse the body of water 200. The ice layer 210 may support the weight of the mobile object 205, which can allow or can prevent the mobile object 205 from traversing the ice layer 210 based on a type of mobile object 205.

The computer 110 can, for example, identify the ice layer 210 based on map data. The computer 110 can receive the map data an external server, e.g., from a weather station, the remote server computer 140, etc. The map data can, for example, specify a presence or an absence of an ice layer 210. The presence or absence of the ice layer can be determined based on weather data, e.g., ambient air temperature, ambient humidity, precipitation data, wind speed, etc., by using predictive models, as discussed below. That is, the external server can receive weather data, e.g., from sensors within a distance of a body of water, and then update the map data upon determining the presence of absence of the ice layer 210. Additionally, or alternatively, the external server can receive a user input specifying the presence or absence of the ice layer 210, e.g., determined based on physical measurement techniques. Additionally, or alternatively, the computer 110 can identify the ice layer 210 based on sensor 115 data, e.g., thermal infrared data. In such an example, the computer 110 can analyze the thermal infrared data to identify a presence or absence of the ice layer 210, e.g., by determining temperatures specified in the thermal infrared data are less than a threshold temperature, e.g., e.g., 32 degrees Fahrenheit.

Upon identifying the ice layer 210, the computer 110 is programmed to determine whether a mobile object 205 is within a boundary of the ice layer 210. The computer 110 may, for example, determine whether the mobile object 205 is within the boundary of the ice layer 210 based on map data. The computer 110 can receive the map data from a remote server computer 140. The map data can, for example, specify a perimeter of an ice layer 210 within the body of water 200, i.e., a geo-fence, based on aggregated data (as discussed below). A geo-fence herein has the conventional meaning of a boundary for an area defined by sets of geo-coordinates. The computer 110 may, for example, receive a location of the mobile object 205, e.g., from a sensor 115, a navigation system, the remote server computer 140, a computer 145, 160 associated with the mobile object 205 (when the mobile object 205 is not the vehicle 105), etc. The computer 110 can then compare the location of the mobile object 205 to the geo-fence for the ice layer 210. The computer 110 can determine that the mobile object 205 is within the boundary of the ice layer 210 based on the location of the mobile object 205 indicating the mobile object 205 is within the geo-fence.

Upon determining the mobile object 205 is outside the geo-fence for the ice layer 210, the computer 110 is programmed to determine whether the mobile object 205 is approaching the ice layer 210. The computer 110 can determine that the mobile object 205 is approaching the ice layer 210 based on determining that a direction of travel of the mobile object 205 is towards the ice layer 210, i.e., the ice layer 210 is in front of the mobile object 205 relative to an object-forward direction (which in the present context typically includes being within an acute angle, e.g., 100 or 15°, in an object-forward direction). The computer 110 can determine the direction of travel of the mobile object 205 based on data, e.g., received from a sensor 115, a navigation system, a remote server computer 140, a computer 145, 160 associated with the mobile object 205 (when the mobile object 205 is not the vehicle 105), etc., indicating an object-forward direction of the mobile object 205.

Additionally, or alternatively, the computer 110 can determine that the mobile object 205 is approaching the ice layer 210 based on the mobile object 205 being within a predetermined distance of the ice layer 210. The predetermined distance may be stored, e.g., in a memory of the computer 110. The predetermined distance may be determined empirically, e.g., based on testing that allows for determining a distance within which a mobile object is likely to move onto an ice layer 210. To determine whether the mobile object 205 is within the predetermined distance of the ice layer 210, the computer 110 can determine geo-coordinates for a point on a boundary of the ice layer 210 at which a line extending from the mobile object 205 along the object-forward direction intersects the boundary of the ice layer 210. The computer 110 can then determine a distance between the location of the mobile object 205 and the point on the boundary, e.g., by comparing respective geo-coordinates. If the distance is less than or equal to the predetermined distance, then the computer 110 can determine that the mobile object 205 is approaching the ice layer 210. If the distance is greater than the predetermined distance, then the computer 110 can determine that the mobile object 205 is not approaching the ice layer 210.

Additionally, or alternatively, the computer 110 can receive and analyze image data to determine that the mobile object 205 is approaching the ice layer 210. The computer 110 can receive the image data from one or more sensors 115 or the computer 145, 160 associated with the mobile object 205 (when the mobile object 205 is not the vehicle 105). In such an example, the image data include the environment in front of the mobile object 205. The computer 110 can determine the mobile object 205 is approaching the ice layer 210 based on detecting a transition from one type of surface to another type of surface, e.g., using image recognition techniques, in front of the mobile object 205. For example, the computer 110 can determine that the mobile object 205 is approaching the ice layer 210 based on detecting a transition from a ground surface (or water surface) to an ice surface in the image data.

Upon determining that the mobile object 205 is approaching the ice layer 210 or is within the geo-fence for the ice layer 210, the computer 110 is programmed to determine a type of mobile object 205. In an example in which the mobile object 205 is the vehicle 105, the computer 110 may store, e.g., in a memory, a type of the vehicle 105, e.g., a car, a truck, a ship, a snowmobile, etc. In an example in which the mobile object 205 is a pedestrian or the second vehicle 155, the computer 110 can receive a message from a computer 145, 160 associated with the mobile object 205 specifying the type of the mobile object 205. Additionally, or alternatively, the computer 110 can receive sensor 115 data, e.g., image data, of an environment around the vehicle 105. The image data can include the mobile object 205. For example, object classification or identification techniques, can be used, e.g., in the computer 110 based on LIDAR sensor 115, camera sensor 115, etc., data to identify a type of mobile object 205 as well as physical features of the mobile object 205.

Any suitable techniques may be used to interpret sensor 115 data. For example, camera and/or LIDAR image data can be provided to a classifier that comprises programming to utilize one or more conventional image classification techniques. For example, the classifier can use a machine learning technique in which data known to represent various objects 205, is provided to a machine learning program for training the classifier. Once trained, the classifier can accept as input vehicle sensor 115 data, e.g., an image, and then provide as output, for each of one or more respective regions of interest in the image, an identification of an object 205 or an indication that no object 205 is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of a user identified from sensor 115 data. Yet further, the computer 110 could employ various techniques for fusing (i.e., incorporating into a common coordinate system or frame of reference) data from different sensors 115 and/or types of sensors 115, e.g., LIDAR, radar, and/or optical camera data.

In addition to determining the type of the mobile object 205, the computer 110 is programmed to actuate one or more sensors 115 to obtain data including the ice layer 210. That is, the vehicle 105 is positioned such that field(s) of view of the sensor(s) 115 include the ice layer 210, e.g., regardless of whether the vehicle 105 is the mobile object 205. The computer 110 can actuate various sensors 115 to obtain corresponding types of data. Specifically, the computer 110 can be programmed to actuate a thermal image sensor 115 positioned to face the ice layer 210. That is, the thermal image sensor 115 is positioned to detect infrared radiation emitted by the ice layer 210. The computer 110 can generate a thermal image based on the infrared data obtained by the thermal image sensor 115. That is, the computer 110 can assign each pixel of a thermal image to a value between, e.g., 0 and 255, based on the detected thermal infrared data. The thermal infrared data in each pixel represents a specific temperature, e.g., a blackbody temperature based on an amount of infrared radiation detected in the pixel. Additionally, the computer 110 may be programmed to actuate other sensors 115, e.g., a radar sensor 115, a LIDAR sensor 115, a camera, etc., positioned to face the ice layer 210, e.g., to detect corresponding data, e.g., electromagnetic radiation, visual light, etc., about the ice layer 210. The computer 110 can provide the thermal image to the remote server computer 140. For example, the computer 110 can transmit the thermal image to the remote server computer 140, e.g., via the network 135. The remote server computer 140 can the store, e.g., in a memory, the thermal image. The remote server computer 140 can maintain, i.e., keep stored in the memory, thermal images received from a plurality of computers.

In addition to generating the thermal image, the computer 110 determines or receives ambient temperature data for the location of the mobile object 205. The ambient temperature data can include a current, i.e., present, ambient temperature for the location of the mobile object 205 and stored, i.e., historical, ambient temperatures for the location of the mobile object 205. As one example, the computer 110 can receive data from a temperature sensor 115 on the vehicle 105 indicating the current ambient temperature around the vehicle 105, e.g., when the vehicle 105 is the mobile object 205. As another example, e.g., when the vehicle 105 is not the mobile object 205, the computer 110 can receive the current ambient temperature for the location of the mobile object 205 from, e.g., a remote server computer 140, the computer 145, 160 associated with the mobile object 205, another computer at (or within a specified distance of) the location of the mobile object 205, etc. In such an example, the remote server computer 140 can receive, e.g., via the network 135, the current ambient temperature for the location of the mobile object 205, e.g., from the computer 145, 160 associated with the mobile object 205. The remote server computer 140 can then store, e.g., in a memory, ambient temperature data for the location. Additionally, the computer 110 can receive stored ambient temperatures for the location of the mobile object 205, e.g., from the remote server computer 140. For example, the remote server computer 140 can maintain, i.e., keep stored in the memory, the ambient temperature data for a specified time period, e.g., determined based on calendar days, consecutive days with the ambient temperature at or below a specified temperature (e.g., 32 degrees Fahrenheit), etc.

To identify region(s) 215 of the ice layer 210, the computer 110 inputs the thermal image and the ambient temperature data into a neural network 500, such as a deep neural network (DNN). (See FIG. 5). In addition to the thermal image and the ambient temperature data, the computer 110 can input other sensor 115 data, e.g., lidar data, radar data, etc., and/or stored thermal images, e.g., received from the remote server computer 140, into the DNN 500. The DNN 500 can be trained to accept the sensor 115 data, specifically the thermal image, and the ambient temperature data as input and generate an output identifying one or more regions 215 of the ice layer 210 and estimated thicknesses for the corresponding regions 215. A region 215 of the ice layer 210 is an area of the ice layer 210 that has a substantially uniform thickness.

Upon identifying the region(s) 215, the computer 110 can classify the region(s) 215 based on the mobile object 205 and the estimated thickness of the respective region 215. Each region 215 can be classified as preferred or nonpreferred. A "preferred" region 215a is an area of the ice layer 210 that may allow the mobile object 205 to traverse the ice layer 210. A "nonpreferred" region 215b is an area of the ice layer 210 that may prevent the mobile object 205 from traversing the ice layer 210.

To classify a region 215, the computer 110 can compare the estimated thickness of a region 215 to a threshold thickness. In an example in which the mobile object 205 is a pedestrian or a land vehicle (See FIGS. 2A and 2C), the computer 110 can determine the classification of the region 215 is preferred based on the estimated thickness being greater than or equal to the threshold thickness. Additionally, the computer 110 can determine the classification of the region 215 is nonpreferred based on the estimated thickness being less than the threshold thickness. In an example in which the mobile object 205 is a watercraft (See FIG. 2B), the computer 110 can determine the classification of the region 215 is nonpreferred based on the estimated thickness being greater than or equal to the threshold thickness. Additionally, the computer 110 can determine the classification of the region 215 is preferred based on the estimated thickness being less than the threshold thickness.

The computer 110 can, for example, determine the threshold thickness based on a characteristic of the mobile object 205. A characteristic herein means a measurement of a physical phenomenon, i.e., a physical quantity, for the mobile object 205. A variety of characteristics may be determined based on the type of mobile object 205. Non-limiting examples of mobile object characteristics include dimensions (e.g., length, width, height), a weight, a speed, an acceleration, tire pressure, a contact area (i.e., an area of the ice layer 210 in contact with the mobile object 205 while the mobile object 205 traverses the ice layer 210), etc. Different mobile objects 205 may be associated with different threshold thicknesses. (See FIG. 3.)

In an example in which the vehicle 105 is the mobile object 205, one or more mobile object 205 characteristics can be stored, e.g., in a memory of the computer 110. In this situation, the computer 110 can determine the one or more mobile object 205 characteristics by accessing the memory. Additionally, or alternatively, the computer 110 can determine one or more mobile object 205 characteristics based on receiving, e.g., via the HMI 118, a user input specifying the mobile object 205 characteristic(s). For example, the computer 110 can actuate the HMI 118 to detect the user input specifying the mobile object 205 characteristic(s), e.g., in substantially the same manner as discussed above. Additionally, or alternatively, the computer 110 can determine one or more mobile object 205 characteristics based on sensor 115 data. In this situation, the computer 110 can receive sensor 115 data, e.g., tire pressure sensor 115 data, weight sensor 115 data, etc., specifying the one or more mobile object characteristics, and/or the computer 110 can determine the mobile object 205 characteristic(s) by using object classification and/or identification techniques, as discussed above.

In an example in which the vehicle 105 is not the mobile object 205, the computer 110 can receive the mobile object 205 characteristic(s) from the computer 145, 160 associated with the mobile object 205, e.g., via the network 135, V2V communications, etc. In this situation, the computer 145, 160 associated with the mobile object 205 can determine the mobile object 205 characteristic(s) in substantially the same manner as just discussed.

The computer 110 may maintain a look-up table, or the like, that associates various mobile object 205 characteristics and types of mobile objects 205 with corresponding threshold thicknesses. Upon determining the mobile object 205 characteristic(s), the computer 110 can access the look-up table and determine the threshold thickness. For example, the computer 110 can select the threshold thickness associated with one or more stored mobile object 205 characteristics and a stored type of mobile object 205 that correspond to, i.e., match, the determined mobile object 205 characteristic(s) and the determined type of mobile object 205.

Additionally, the computer 110 can determine the threshold thickness based on a user input specifying the threshold thickness. In such an example, the user input may specify the threshold thickness to be greater than or equal to the threshold thickness determined based on the characteristic of the mobile object 205. That is, the computer 110 can determine to increase the threshold thickness based on the user input.

In an example in which the vehicle 105 is the mobile object 205, the computer 110 may actuate the HMI 118 to detect the user input specifying the threshold thickness. For example, the HMI 118 may be actuated and/or instructed by the computer 110 to display virtual buttons and/or some other suitable input mechanism on a touchscreen display that a user can select to specify the threshold thickness. In other words, the HMI 118 may activate sensors 115 that can detect the user selecting the virtual buttons to specify the threshold thickness. Upon detecting the user input, the HMI 118 can provide the user input to the computer 110, and the computer 110 can determine the threshold thickness for classifying the region(s) 215 of the ice layer 210.

In an example in which the vehicle 105 is not the mobile object 205, the computer 110 can receive a message specifying the user input from the computer 145, 160 associated with the mobile object 205. In such an example, the computer 145, 160 associated with the mobile object 205 can determine the user input in substantially the same manner as just discussed. Upon determining the user input, the computer 145, 160 associated with the mobile object 205 can provide the user input to the computer 110, e.g., via the network 135, V2V communications, etc.

Upon classifying the region(s) 215 of the ice layer 210, the computer 110 can output the classifications. For example, the computer 110 can actuate the HMI 118 to display map data of the ice layer 210 specifying the regions 215 and the corresponding classifications. For example, the HMI 118 can display map data that labels the preferred regions 215a and the nonpreferred regions 215b. (See FIG. 4A). Additionally, or alternatively, the computer 110 can provide the classifications to the remote server computer 140, the user device 145, the second computer 160, etc., e.g., via the network 135. In an example in which the vehicle 105 is not the mobile object 205, upon receiving the classifications from the computer 110, the computer 145, 160 associated with the mobile object 205 may be programmed to output the classifications (See FIG. 4B), as just discussed.

The computer 110 may be programmed to update the map of the ice layer 210, e.g., stored in the memory of the computer 110, received from the remote server computer 140, etc., to specify the region(s) 215 of the ice layer 210 and the corresponding classification(s). For example, the computer 110 can update the region(s) 215, i.e., geo-coordinates specifying the region(s) 215, based on the output from the DNN 500. Additionally, the computer 110 can update the classification(s) for the corresponding region(s) 215 based on the determined classification(s). The computer 110 can store the updated map, e.g., in a memory of the computer 110. Additionally, or alternatively, the computer 110 can provide the updated map to the remote server computer 140, e.g., via the network 135.

Additionally, the computer 110 can generate a planned path P for the mobile object 205 based on the classifications. The computer 110 determines the planned path P such that the mobile object 205 avoids nonpreferred regions 215 while moving along the planned path P. That is, the planned path P may be constrained to extend across preferred regions 215. For example, the planned path P may direct the mobile object 205 to move across preferred regions 215 and to avoid nonpreferred regions 215. Upon determining the planned path P, the computer 110 can output the planned path P. For example, the computer 110 can actuate the HMI 118 to display a representation of the planned path P (See FIG. 4A). Additionally, or alternatively, the computer 110 can provide the planned path P to the remote server computer 140, the user device 145, the second computer 160, etc., e.g., via the network 135. In an example in which the vehicle 105 is not the mobile object 205, upon receiving the planned path P from the computer 110, the computer 145, 160 associated with the mobile object 205 may be programmed to output the planned path P (See FIG. 4B), as discussed above.

As used herein, a "path" is a set of points, e.g., that can be specified as coordinates with respect to a vehicle coordinate system and/or geo-coordinates, that the computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \quad (1)$$

where $a_0$ an offset, i.e., a lateral distance between the path and a center line of the vehicle 105 at the upcoming distance x, $a_1$ is a heading angle of the path, $a_2$ is the curvature of the path, and $a_3$ is the curvature rate of the path.

In an example in which the vehicle 105 is the mobile object 205, the computer 110 may be programmed to operate the vehicle 105 along the planned path P. That is, the computer 110 may actuate one or more vehicle components 125 to move the vehicle 105 along the planned path P. In such an example, the computer 110 may actuate one or more vehicle components 125 to stop the vehicle 105 at a destination and/or at one or more waypoints along the planned path P. The computer 110 can, for example, determine one or more waypoints based on receiving, e.g., via the HMI 118, a user input specifying the waypoint(s). As another example, the computer 110 can determine one or more waypoints based on determining one or more points along the planned path P that corresponds to the estimated thickness of the ice layer 210 being a maximum thickness.

The computer 110 can predict a future time at which a classification of a region 215 will transition between preferred and nonpreferred based on the characteristic(s) of the mobile object 205 and predicted ambient temperature data. For example, computer 110 can receive predicted ambient temperature data, i.e., a forecast, for the location of the mobile object 205. The predicted ambient temperature data can specify expected ambient temperatures for the location at specified time intervals, e.g., 15 minutes, one hour, etc., for a specified duration of time, e.g., one day, one week, etc. The computer 110 can then predict a thickness for the region 215 at each specified time interval based on the estimated thickness for the region 215 and the corresponding predicted ambient temperature, e.g., by using known thermodynamic calculation methods and/or known predictive models for ice growth, e.g., as described at http://lakeice.squarespace.com/ice-growth/, and/or ice thaw, e.g., as described at the time of filing this application at http://lakeice.squarespace.com/thawed-ice/.

Upon predicting the thickness of the ice layer 210 at each specified time interval of the predicted ambient temperature data, the computer 110 can compare each predicted thickness to the threshold thickness. If the region 215 is classified as preferred, then the computer 110 can predict that the region 215 will transition to nonpreferred between specified time intervals in which the predicted thickness of the region 215 decreases below the threshold thickness. If the region 215 is classified as nonpreferred, then the computer 110 can predict that the region 215 will transition to preferred between specified time intervals in which the predicted thickness of the region 215 increases above the threshold thickness.

Upon predicting the future time at which the region 215 will transition between preferred and nonpreferred, the computer 110 can output the future time and the predicted classification for the region 215. For example, the computer 110 can actuate the HMI 118 to display the future time and the predicted classification. Additionally, or alternatively, the computer 110 can provide the future time and the predicted classification to the remote server computer 140, the user device 145, the second computer 160, etc., e.g., via the network 135. In an example in which the vehicle 105 is not the mobile object 205, upon receiving the future time and the predicted classification for the region 215, the computer 145, 160 associated with the mobile object 205 may be programmed to output the future time and the predicted classification for the region 215, as discussed above.

Upon predicting that a preferred region 215 will transition to a nonpreferred region 215b at a future time, the computer 110 may be programmed to output an alert prior to the future time, e.g., by an amount of time specified by a user input received, e.g., via the HMI 118, from the computer 145, 160 associated with the mobile object 205, from the remote server computer 140, etc. The alert may indicate to move the mobile object 205 from a current region 215 to another region 215 that is predicted to be preferred at the future time. As one example, the computer 110 can actuate one or more vehicle components 125, e.g., speakers, lights, a horn, etc., to output the alert. Additionally, or alternatively, the computer 110 can send a message to the computer 145, 160 associated with the mobile object 205. In this situation, the computer 145, 160 associated with the mobile object 205 can actuate one or more components, e.g., speakers, lights, etc., to output the alert.

Additionally, or alternatively, the computer 110 can determine an updated path P for the mobile object 205 at the future time based on the predicted classifications for the regions 215 at the future time. The computer 110 can determine the updated path P in substantially the same manner as discussed above. Upon determining the updated path P, the computer 110 can output the updated path P, as discussed above. Additionally, or alternatively, the computer 110 can provide the updated path P to the remote server computer 140, the user device 145, the second computer 160, etc., e.g., via the network 135. In an example in which the vehicle 105 is not the mobile object 205, upon receiving the updated path P from the computer 110, the computer 145, 160 associated with the mobile object 205 may be programmed to output the updated path P, as discussed above.

The computer 110 can determine that the mobile object 205 is stationary, i.e., stopped, in a region 215 based on sensor 115 data. In an example in which the vehicle 105 is the mobile object 205, the computer 110 can receive data from one or more sensors 115, e.g., a wheel speed sensor 115, variable reluctance sensors 115, tachogenerators, etc., indicating that the vehicle 105 is stopped. In an example in which the vehicle 105 is not the mobile object 205, the computer 110 can receive sensor data from the computer 145, 160 associated with the mobile object 205 that specifies a speed of the mobile object 205. Based on the received sensor data indicating that the mobile object 205 is stopped, the computer 110 can determine that the mobile object 205 is stationary.

Upon determining that the mobile object 205 is stationary, the computer 110 can identify the region 215 based on comparing a location of the mobile object 205 to a boundary for the region 215, e.g., output via the DNN 500. Additionally, the computer 110 can initiate a timer. A duration of the timer may be determined empirically, e.g., based on testing that allows for determining an amount of time within which a presence of a mobile object 205 is likely to affect a thickness of an ice layer 210 (e.g., based on a temperature of the mobile object 205). The duration of the timer may be stored, e.g., in a memory of the computer 110. The computer 110 can reset the timer upon detecting the mobile object 205 departing the region 215, e.g., based on sensor 115 data (as discussed above).

Upon expiration of the timer, the computer 110 can determine an updated classification for the region 215 in which the mobile object 205 is located based on an updated ambient temperature and a temperature for the mobile object 205. The updated ambient temperature is ambient temperature obtained when the timer expires. The computer 110 can obtain the updated ambient temperature from sensor 115 data, a remote server computer 140, the computer 145, 160 associated with the mobile object 205, etc., as discussed above. The computer 110 can determine the temperature of the mobile object 205 based on sensor 115 data. In an example in which the vehicle 105 is the mobile object 205, the computer 110 can receive temperature data from one or more sensors 115 indicating a temperature of the vehicle 105 or one or more components 125 thereof. In an example in which the vehicle 105 is not the mobile object 205, the computer 110 can obtain a subsequent thermal image that includes the mobile object 205. The computer 110 can then determine the temperature of the mobile object 205 based on the thermal image, e.g., according to known image processing techniques. Additionally, or alternatively, the computer 110 can receive temperature data of the mobile object 205, e.g., from the computer 145, 160 associated with the mobile object 205.

Based on the updated ambient temperature and the temperature of the mobile object 205, the computer 110 can determine an updated estimated thickness of the region 215, e.g., by using known thermodynamic calculation techniques and/or known environmental prediction models, as discussed above. The computer 110 can then compare the updated estimated thickness to the threshold thickness. The computer 110 can then update the classification of the region 215 based on the comparison of the updated estimated thickness to the threshold thickness, e.g., in substantially the same manner as discussed above.

Upon determining the updated classification for the region 215, the computer 110 can output the updated classification, as discussed above. Additionally, or alternatively, the computer 110 can provide the updated classification to the remote server computer 140, the user device 145, the second computer 160, etc., e.g., via the network 135. Additionally, or alternatively, the computer 110 can be programmed to output the alert and/or send a message to the computer 145, 160 associated with the mobile object 205 specifying the alert based on the updated classification, as discussed above. Additionally, or alternatively, the computer 110 can determine an updated planned path P for the mobile object 205 based on the updated classification, as discussed above. Additionally, or alternatively, the computer 110 can update the map based on the updated classification, as discussed above. Additionally, or alternatively, the computer 110 can predict an updated future time at which the region 215 will transition between preferred and nonpreferred based on the updated classification, as discussed above.

The remote server computer 140 may be programmed to generate (and/or update) the map data of the ice layer 210, e.g., stored in the second memory, based on aggregated data. Aggregated data means data from a plurality of computers 110 that provide messages and then combining (e.g., by averaging and/or using some other statistical measure) the results. That is, the remote server computer 140 may be programmed to receive messages from a plurality of computers 110 indicating one or more regions 215 of an ice layer 210 and respective estimated thickness for each region 215 based on vehicle 105 data of a plurality of vehicles 105. Based on the aggregated data indicating the respective estimated thicknesses of the corresponding regions 215 of the ice layer 210 (e.g., an average number of messages, a percentage of messages, etc., indicating the estimated thicknesses of corresponding regions 215), and taking advantage of the fact that messages from different vehicles 105 are provided independently of one another, the remote server computer 140 can generate (and/or update) the map data to specify ice layer 210 and the estimated thicknesses of corresponding regions 215 based on the vehicle 105 data. The remote server computer 140 can then transmit the map data to a plurality of vehicles 105, including the vehicle 105, e.g., via the network 135.

Figure 5:
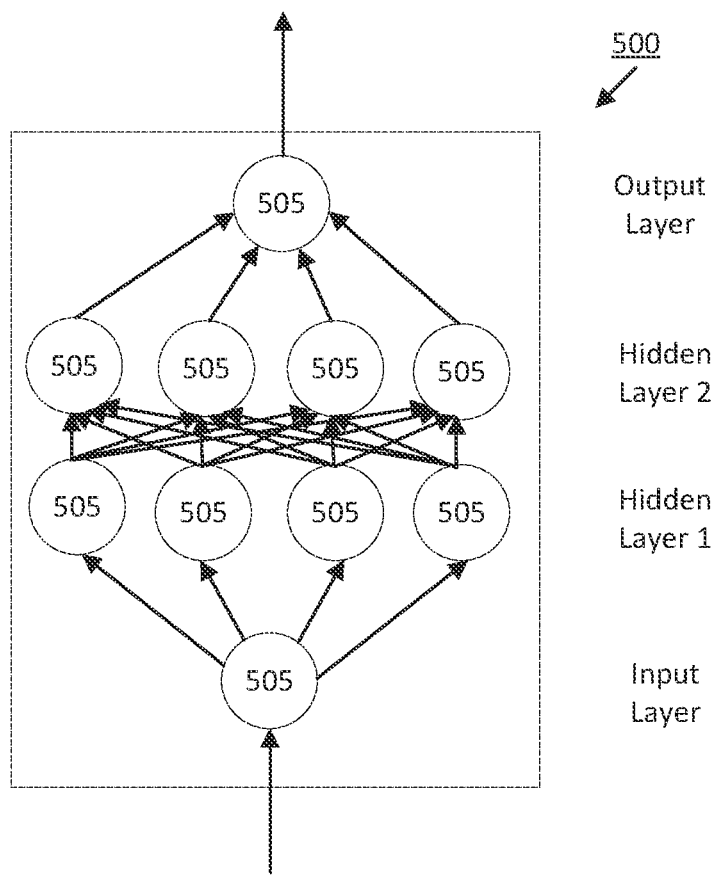
FIG. 5 is an example neural network.

FIG. 5 is a diagram of an example deep neural network (DNN) 500 that can be trained to identify regions 215 of an ice layer 210 and estimate thicknesses for the regions 215 based on sensor 115 data, and specifically a thermal image including the ice layer 210, and ambient temperature data. The DNN 500 can be a software program that can be loaded in memory and executed by a processor included in a computer, for example. In an example implementation, the DNN 500 can include, but is not limited to, a convolutional neural network (CNN), R-CNN (Region-based CNN), Fast R-CNN, and Faster R-CNN. The DNN 500 includes multiple nodes, and the nodes are arranged so that the DNN 500 includes an input layer, one or more hidden layers, and an output layer. Each layer of the DNN 500 can include a plurality of nodes 505. While FIG. 5 illustrates two hidden layers, it is understood that the DNN 500 can include additional or fewer hidden layers. The input and output layers for the DNN 500 may include more than one node 505.

The nodes 505 are sometimes referred to as artificial neurons 505 because they are designed to emulate biological, e.g., human, neurons. A set of inputs (represented by the arrows) to each neuron 505 are each multiplied by respective weights. The weighted inputs can then be summed in an input function to provide, possibly adjusted by a bias, a net input. The net input can then be provided to an activation function, which in turn provides a connected neuron 505 an output. The activation function can be a variety of suitable functions, typically selected based on empirical analysis. As illustrated by the arrows in FIG. 5, neuron 505 outputs can then be provided for inclusion in a set of inputs to one or more neurons 505 in a next layer.

As one example, the DNN 500 can be trained with ground truth data, i.e., data about a real-world condition or state. For example, the DNN 500 can be trained with ground truth data and/or updated with additional data by a processor of the remote server computer 140. Weights can be initialized by using a Gaussian distribution, for example, and a bias for each node 505 can be set to zero. Training the DNN 500 can include updating weights and biases via suitable techniques such as back-propagation with optimizations. Ground truth data used for training can include, but is not limited to, data manually labeled by human operators as specifying thicknesses for regions 215 of ice layers 210 in thermal images given ambient temperature data.

During operation, the computer 110 obtains a thermal image including an ice layer 210 and ambient temperature data for a location of a mobile object 205 approaching the ice layer 210. Additionally, the computer 110 can receive additional sensor 115 data including the ice layer 210. The computer 110 provides the thermal image (and additional sensor 115 data) and the ambient temperature data to the DNN 500. The DNN 500 generates an output based on the received input. The output is an identification of one or more regions 215 of the ice layer 210 and corresponding estimated thicknesses for the regions 215.

Figure 6A:
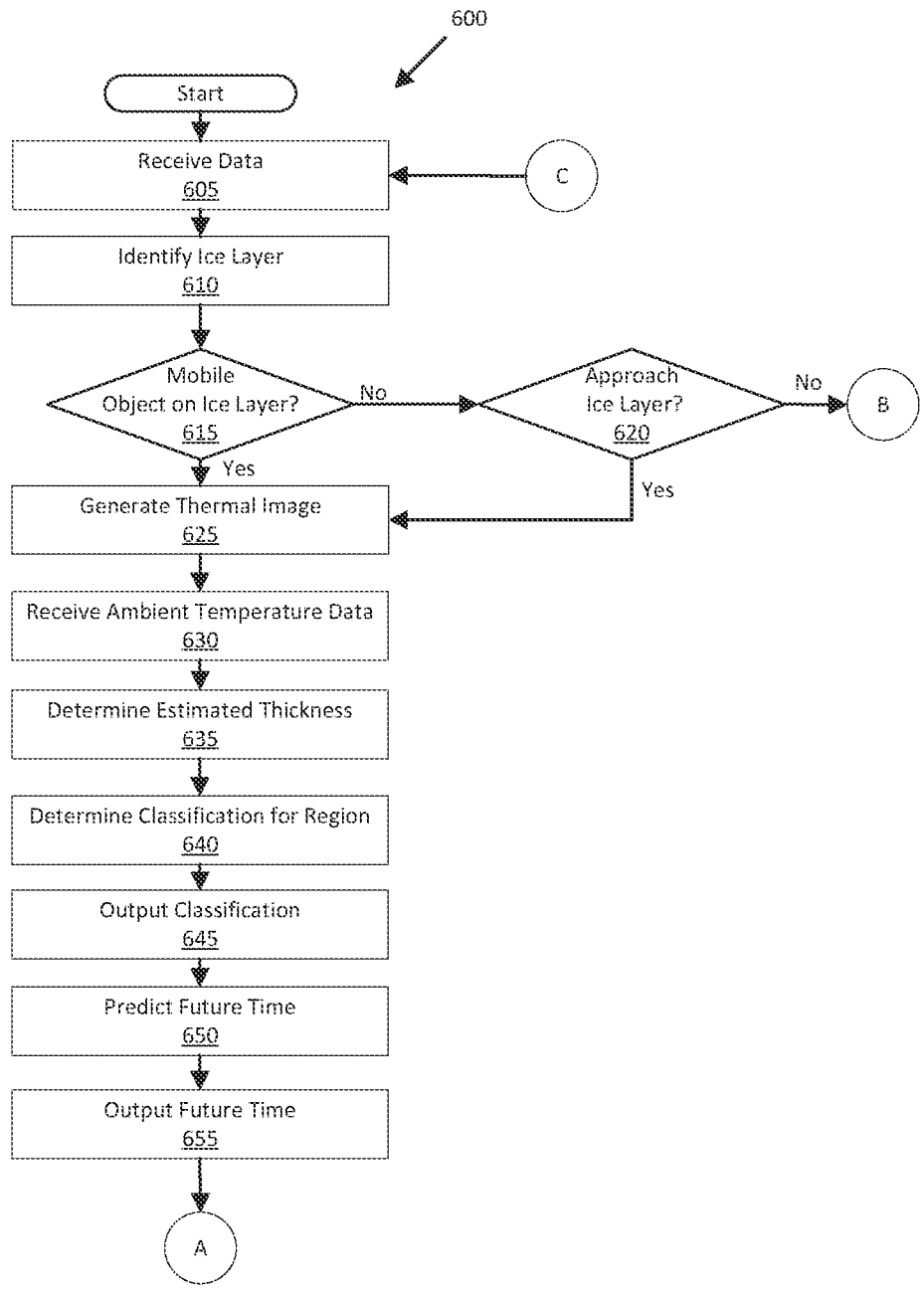
FIG. 6A is a first portion of an example flowchart of an example process for classifying regions of the ice layer.

FIG. 6A is a first portion of a flowchart of an example process 600 (other portions being shown in FIG. 6B because the entire flowchart will not fit on a single drawing sheet) executed in a computer 110 according to program instructions stored in a memory thereof for classifying regions 215 of an ice layer 210. Process 600 includes multiple blocks that can be executed in the illustrated order. Process 600 could alternatively or additionally include fewer blocks or can include the blocks executed in different orders.

Process 600 begins in a block 605. In the block 605, the computer 110 receives data from one or more sensors 115, e.g., via a vehicle network, from a remote server computer 140, e.g., via a network 135, and/or from another computer 145, 160, e.g., via the network 135, V2V communications, V2X communications, etc. For example, the computer 110 can receive location data for a mobile object 205. As discussed above, the mobile object 205 can be the vehicle 105, a second vehicle 155, or a pedestrian. Additionally, or alternatively, the computer 110 can receive image data, e.g., from one or more sensors 115. The image data may include data about the environment around the mobile object 205. The process 600 continues in a block 610.

In the block 610, the computer 110 identifies an ice layer 210. The computer 110 can identify the ice layer 210 based on the sensor 115 data obtained in the block 605 and/or map data, as discussed above. The process 600 continues in a block 615.

In the block 615, the computer 110 determines whether the mobile object 205 is on the ice layer 210. The computer 110 can determine that the mobile object 205 is on the ice layer based on a location of the mobile object 205 and a geo-fence of the ice layer 210, as discussed above. If the mobile object 205 is on the ice layer 210, then the process 600 continues in a block 625. Otherwise, the process 600 continues in a block 620.

In the block 620, the computer determines whether the mobile object 205 is approaching, i.e., moving towards, the ice layer 210. The computer 110 can determine that the mobile object 205 is approaching the ice layer 210 based on data indicating an object-forward direction for the mobile object 205 extends towards the ice layer 210, as discussed above. Additionally, or alternatively, the computer 110 can determine that the mobile object 205 is approaching the ice layer 210 based on the mobile object 205 being within a predetermined distance of the ice layer 210, as discussed above. If the mobile object 205 is approaching the ice layer 210, then the process 600 continues in the block 625. Otherwise, the process 600 continues a block 685.

In the block 625, the computer 110 generates a thermal image of the ice layer 210 based on infrared data obtained by a thermal image sensor 115 positioned to face the ice layer 210, as discussed above. The computer 110 can obtain additional sensor 115 data of the ice layer 210, as discussed above. The computer 110 The process 600 continues in a block 630.

In the block 630, the computer 110 receives ambient temperature data for the location of the mobile object 205. As discussed above, ambient temperature data includes a current ambient temperature and stored, i.e., historical, ambient temperatures for the location. The computer 110 can receive the ambient temperature data from one or more sensors 115, e.g., via a vehicle network, from a remote server computer 140, e.g., via a network 135, and/or from another computer 145, 160, e.g., via the network 135, V2V communications, V2X communications, etc., as discussed above. The process 600 continues in a block 635.

In the block 635, the computer 110 determines estimated thicknesses for one or more regions 215 of the ice layer 210. The computer 110 inputs the sensor 115 data, specifically the thermal image, and the ambient temperature data to the DNN 500, and the DNN 500 outputs an identification of one or more regions 215 and an estimated thickness for the respective regions, as discussed above. The process 600 continues in a block 640.

In the block 640, the computer 110 determines a classification for each region 215. The computer 110 can classify each region 215 as preferred or nonpreferred based on a characteristic of the mobile object 205 and/or a user input, as discussed above. The process 600 continues in a block 645.

In the block 645, the computer 110 outputs the classifications, as discussed above. Additionally, the computer 110 can determine a planned path for the mobile object 205 based on the classifications for the identified regions 215, as discussed above. In this situation, the computer 110 can output the planned path, as discussed above. Additionally, the computer 110 can update the map data to specify the identified regions and the determined classifications. In such an example, the computer 110 can then provide the updated map data to the remote server computer 140, which can update the map data further based on aggregated data, as discussed above. The process 600 continues in a block 650.

In the block 650, the computer 110 determines a future time at which a classification for a region 215 will transition between preferred and nonpreferred. The computer 110 can determine the future time based on predicted ambient temperature data and the estimated thickness of the region 215 obtained via the block 635, as discussed above. The process 600 continues in a block 655.

In the block 655, the computer 110 outputs the future time and a predicted state of the region at the future time, as discussed above. Additionally, the computer 110 can determine an updated path for the mobile object 205 at the future time, and output the updated path, as discussed above. In an example in which the vehicle 105 is the mobile object 205, the computer 110 can operate the vehicle 105 along the updated path, as discussed above. Additionally, or alternatively, the computer 110 can output an alert prior to the future time, e.g., by an amount of time specified by a user input, as discussed above. The alert may indicate to move the mobile object 205 from a current region 215 to another region 215 that is predicted to be preferred at the future time, as discussed above. The process 600 continues in a block 660.

Figure 6B:
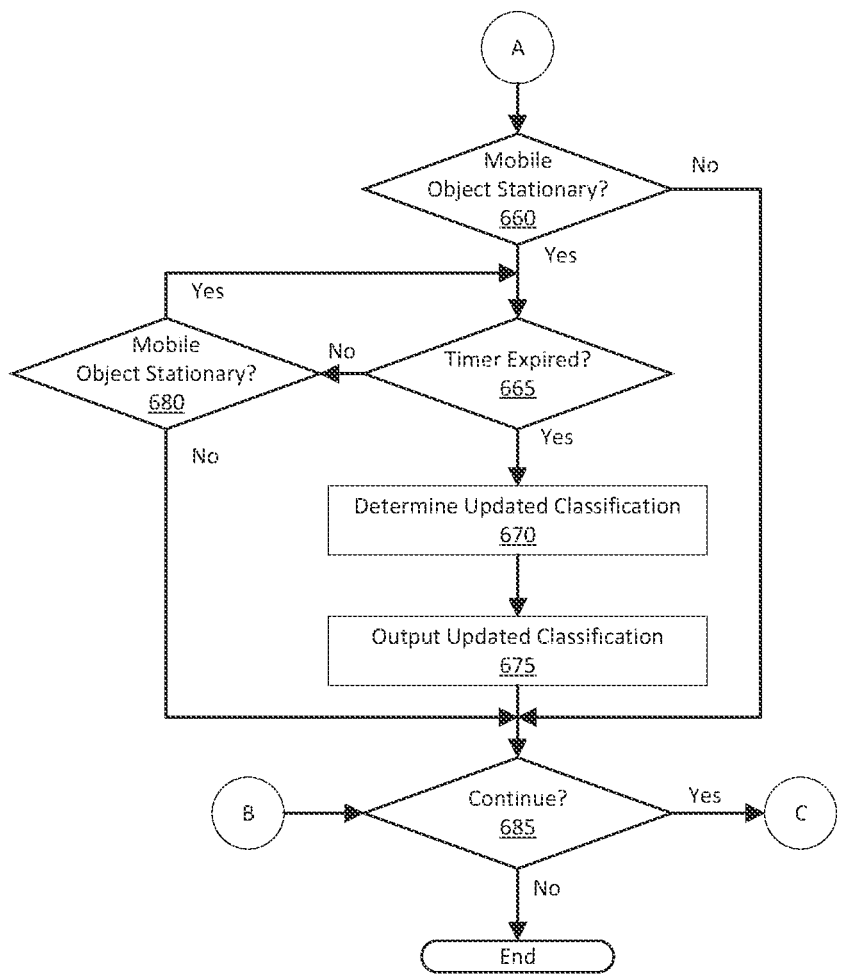
FIG. 6B is a second portion of the flowchart of FIG. 6A.

Turning now to FIG. 6B, following the block 655 shown in FIG. 6A, in the block 660, the computer 110 determines whether the mobile object 205 is stationary in a region 215. The computer 110 can receive data indicating that the mobile object 205 is stationary from one or more sensors 115, e.g., via a vehicle network, from a remote server computer 140, e.g., via a network 135, and/or from another computer 145, 160, e.g., via the network 135, V2V communications, V2X communications, etc., as discussed above. If the mobile object 205 is stationary, then the computer 110 initiates a timer and the process 600 continues in a block 665. Otherwise, the process 600 continues in a block 685.

In the block 665, the computer 110 determines whether the timer has expired. If the timer has expired, then the process 600 continues in a block 670. Otherwise, the process 600 continues in a block 680.

In the block 670, the computer 110 determines an updated classification for the region 215 based on an updated ambient temperature and a temperature of the mobile object 205, as discussed above. The computer 110 can receive the temperature of the mobile object 205 from one or more sensors 115, e.g., via a vehicle network, from a remote server computer 140, e.g., via a network 135, and/or from another computer 145, 160, e.g., via the network 135, V2V communications, V2X communications, etc., as discussed above. The process 600 continues in a block 675.

In the block 675, the computer 110 outputs the updated classification for the region 215. Additionally, the computer 110 can determine an updated path for the mobile object 205 based on the updated classification, as discussed above. Additionally, the computer 110 can output the alert based on the updated classification, as discussed above. Additionally, the computer 110 can predict an updated future time at which the region 215 will transition between preferred and nonpreferred based on the updated classification, as discussed above. The process 600 continues in a block 685.

In the block 680, the computer 110 determines whether the mobile object 205 remains stationary in the region 215. The block 680 is substantially identical to the block 660 of the process 600 except that the timer is not initiated in the block 680. If the computer 110 determines that the mobile object 205 remains stationary, then the process 600 returns to the block 665. Otherwise, the computer 110 resets the timer and the process 600 continues in the block 685.

In the block 685, the computer 110 determines whether to continue the process 600. For example, the computer 110 can determine not to continue when the vehicle 105 is powered off. Conversely, the computer 110 can determine to continue when the vehicle 105 is powered on. If the computer 110 determines to continue, the process 600 returns to the block 605. Otherwise, the process 600 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor programmed to:

upon determining a mobile object is approaching an ice layer above a body of water, obtain a thermal image of the ice layer;

input the thermal image and ambient temperature data to a neural network that outputs a plurality of regions of the ice layer and respective estimated thicknesses for the regions;

determine a classification for each region based on its estimated thickness and the mobile object, wherein the classification is one of preferred or nonpreferred;

predict a future time at which the classification for one region will transition between preferred and nonpreferred based on a characteristic of the mobile object and predicted ambient temperature data; and output the classifications for the regions.

2. The system of claim 1, wherein the mobile object is one of a land vehicle or a pedestrian, and wherein the instructions further include instructions to classify one of the regions as preferred based on the estimated thickness of the respective region being greater than a threshold thickness.

3. The system of claim 2, wherein the instructions further include instructions to determine the threshold thickness based on a user input.

4. The system of claim 2, wherein the instructions further include instructions to determine the threshold thickness based on a characteristic of the mobile object.

5. The system of claim 2, wherein the instructions further include instructions to classify the one of the regions as nonpreferred based on the estimated thickness of the respective region being less than or equal to the threshold thickness.

6. The system of claim 1, wherein the mobile object is a watercraft, and wherein the instructions further include instructions to classify one of the regions as preferred based on the estimated thickness of the respective region being less than or equal to a threshold thickness.

7. The system of claim 1, wherein the instructions further include instructions to determine a planned path for the mobile object based on the classifications of the regions.

8. The system of claim 7, wherein the instructions further include instructions to output the planned path for the mobile object.

9. The system of claim 7, wherein the instructions further include instructions to provide the planned path for the mobile object to a remote computer.

10. The system of claim 1, wherein the instructions further include instructions to update map data for the ice layer based on the classifications of the regions.

11. The system of claim 10, wherein the instructions further include instructions to provide the updated map data to a remote computer.

12. The system of claim 11, further comprising the remote computer including a second processor and a second memory, the second memory storing instructions executable by the second processor to update a map based on aggregated data including updated map data from a plurality of mobile objects.

13. The system of claim 1, wherein the instructions further include instructions to, upon determining the mobile object remains stationary for a duration of a timer, determining updated classifications for the region in which the mobile object is located based on an updated ambient temperature and temperature data of the mobile object.

14. The system of claim 13, wherein the updated ambient temperature is obtained upon expiration of the timer.

15. The system of claim 13, wherein the instructions further include instructions to output the updated classification.

16. The system of claim 13, wherein the instructions further include instructions to update map data for the ice layer based on the updated classification.

17. The system of claim 1, wherein the ambient temperature data includes current ambient temperature and historical ambient temperature.

18. A method, comprising:
upon determining a mobile object is approaching an ice layer above a body of water, obtaining a thermal image of the ice layer;
inputting the thermal image and ambient temperature data to a neural network that outputs a plurality of regions of the ice layer and respective estimated thicknesses for the regions;
determining a classification for each region based on its estimated thickness and the mobile object, wherein the classification is one of preferred or nonpreferred;
predict a future time at which the classification for one region will transition between preferred and nonpreferred based on a characteristic of the mobile object and predicted ambient temperature data; and
outputting the classifications for the regions.

19. The method of claim 18, further comprising determining a planned path for the mobile object based on the classifications of the regions.

20. The method of claim 18, wherein the mobile object is one of a land vehicle or a pedestrian, and wherein the instructions further include instructions to classify one of the regions as preferred or nonpreferred based on comparing the estimated thickness of the respective region to a threshold thickness.

* * * * *